United States Patent
Tamezane et al.

(10) Patent No.: US 8,413,473 B2
(45) Date of Patent: Apr. 9, 2013

(54) MECHANICAL KEY CODE VERIFICATION SYSTEM

(75) Inventors: Takumi Tamezane, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 12/353,040

(22) Filed: Jan. 13, 2009

(65) Prior Publication Data

US 2009/0178447 A1 Jul. 16, 2009

(30) Foreign Application Priority Data

Jan. 15, 2008 (JP) ................................ 2008-006055

(51) Int. Cl.
  *E05B 21/00* (2006.01)
(52) U.S. Cl.
  USPC ................... 70/352; 70/387; 70/405; 70/409
(58) Field of Classification Search ............. 70/352, 70/387, 405, 344, 345, 348, 350, DIG. 1, 70/DIG. 2, DIG. 47, DIG. 78, DIG. 80, 409
  See application file for complete search history.

(56) References Cited

U.S. PATENT DOCUMENTS

| | | | | | |
|---|---|---|---|---|---|
| 1,224,021 | A | * | 4/1917 | Renaux | 70/365 |
| 3,595,042 | A | * | 7/1971 | Sedley | 70/276 |
| 3,640,107 | A | * | 2/1972 | Litvin | 70/129 |
| 3,834,197 | A | * | 9/1974 | Sedley | 70/38 C |
| 3,974,670 | A | * | 8/1976 | Wolter | 70/493 |
| 4,149,394 | A | * | 4/1979 | Sornes | 70/352 |
| 4,287,737 | A | * | 9/1981 | Ahn | 70/467 |
| 4,452,059 | A | * | 6/1984 | Sornes | 70/278.2 |
| 4,754,630 | A | * | 7/1988 | Kawakami | 70/352 |
| 5,181,407 | A | * | 1/1993 | Wu | 70/361 |
| 5,343,724 | A | * | 9/1994 | Sornes | 70/340 |
| 5,355,701 | A | * | 10/1994 | Tobias | 70/394 |
| 5,375,443 | A | * | 12/1994 | Tamura | 70/352 |
| 5,469,723 | A | * | 11/1995 | Litwin et al. | 70/107 |
| 6,220,066 | B1 | * | 4/2001 | Haggstrom | 70/352 |
| 6,474,123 | B1 | * | 11/2002 | Kito et al. | 70/456 R |
| 6,499,327 | B1 | * | 12/2002 | Sugimoto | 70/423 |
| 2004/0237613 | A1 | | 12/2004 | Shimura et al. | |

FOREIGN PATENT DOCUMENTS

| | | |
|---|---|---|
| CN | 2108771 U | 7/1992 |
| CN | 1572997 A | 2/2005 |
| JP | 52-128800 | 10/1977 |
| JP | 57-58784 | 4/1982 |
| JP | 59-21417 | 5/1984 |
| JP | 59-158872 | 9/1984 |
| JP | 61-146357 Y | 9/1986 |
| JP | 08-022526 | 1/1996 |
| JP | 10-102846 | 4/1998 |
| JP | 3090369 | 9/2002 |
| JP | 2004-76375 | 3/2004 |
| JP | 2005-206048 | 8/2005 |

* cited by examiner

*Primary Examiner* — Lloyd Gall
(74) *Attorney, Agent, or Firm* — Patterson Thuente Pedersen, PA (57) ABSTRACT

A key system including a mechanical key and a lock apparatus into which the mechanical key is insertable. The mechanical key includes a key code pattern having recessed portions and non-recessed portions. The mechanical key is operated in key manipulation directions. The lock apparatus includes tumblers, each of which is associated with one of the recessed and non-recessed portions. The lock apparatus mechanically verifies the key code pattern when the mechanical key is inserted therein based on whether the tumblers are aligned with the associated recessed and non-recessed portions. The recessed and non-recessed portions in the key code pattern are deviated from the key manipulation directions.

8 Claims, 9 Drawing Sheets

MECHANICAL KEY CODE VERIFICATION SYSTEM

CROSS-REFERENCE TO RELATED APPLICATIONS

This application is based upon and claims the benefit of priority from prior Japanese Patent Application No. 2008-006055, filed on Jan. 15, 2008, the entire contents of which are incorporated herein by reference.

BACKGROUND OF THE INVENTION

The present invention relates to a mechanical key code verification system for use with a mechanical key having a key code pattern of recessed portions and non-recessed portions and including a lock apparatus that mechanically verifies the key code pattern.

In the prior art, various types of key systems are used to prevent unauthorized use of articles, doors, and the like by a third person. A typical key system uses a key that includes a grip and an elongated key plate (also referred to as a key blade), which has an engraved key code. Insertion of the key plate into a cylinder of a lock apparatus aligns the engraved key code with a plurality of disk tumblers (small steel pieces), which are biased by springs arranged in the cylinder. Rotation of the cylinder with the key is permitted when the key code of the key plate matches a key shape formed by the disk tumblers. In such a case, the opening and closing of the lock apparatus is enabled.

Figure 10:
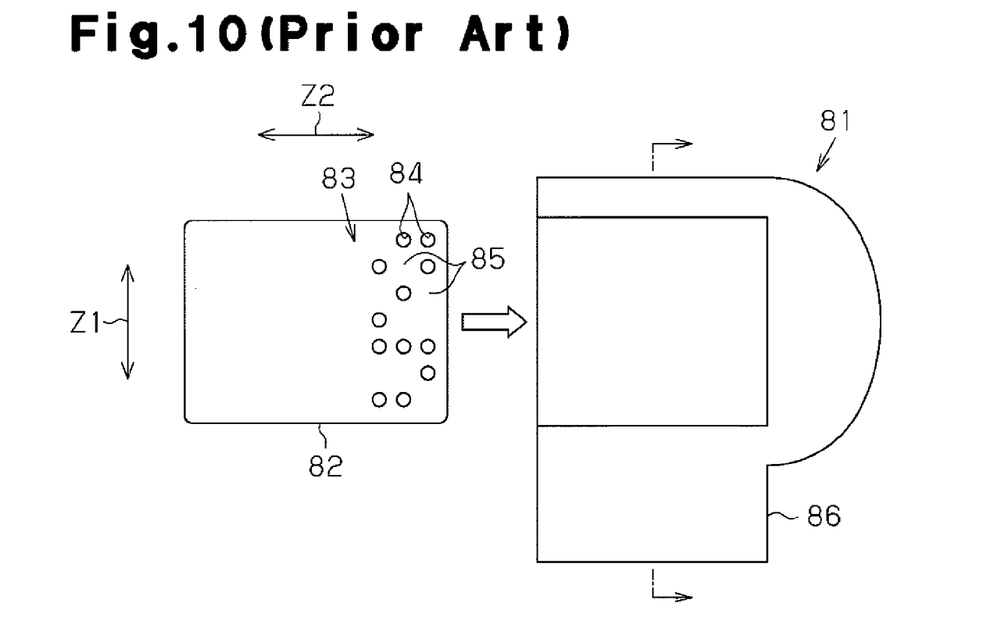
FIG. 10 is a plan view showing a lock apparatus before insertion of a card key in the prior art.

Japanese Utility Model Registration No. 3090369 (patent document 1) and Japanese Laid-Open Patent Publication No. 2004-76375 (patent document 2) describe examples of a card key system using a card key. FIG. 10 illustrates a card key system 81. The card key system 81 includes a card key 82 and a lock apparatus 86. The card key 82 has a key code pattern 83 including a plurality of holes 84 arranged in accordance with a key code of the card key 82.

Figure 11:
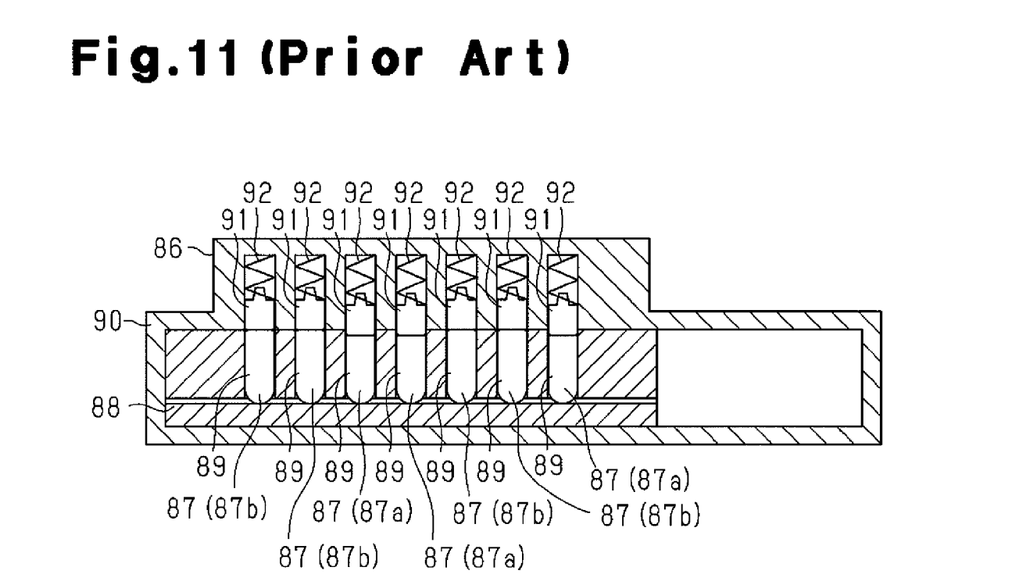
FIG. 11 is a cross-sectional view of the lock apparatus shown in FIG. 10.

FIG. 11 illustrates the lock apparatus 86 (also referred to as a fixed component) in a state in which the card key 82 is not inserted therein. The lock apparatus 86 includes a supporting member 90 and a movable member 88 supported by the supporting member 90. The movable member 88 moves relative to the supporting member 90 when the card key 82 is inserted into the lock apparatus 86 to perform a key operation. The movable member 88 and the supporting member 90 may be referred to as the movable side and fixed side, respectively. A plurality of pin tumblers 87 are arranged so as to extend into the movable member 88 and the supporting member 90. Each pin tumbler 87 includes a lock pin 89 accommodated in the movable member 88 and a plunger pin 91 accommodated in the supporting member 90. The plunger pin 91 is biased towards the lock pin 89 by a tumbler spring 92. The plurality of pin tumblers 87 include first pin tumblers 87a and second pin tumblers 87b. In each first pin tumbler 87a, the plunger pin 91 is engaged with both of the movable member 88 and the supporting member 90 when the card key 82 is not inserted into the lock apparatus 86. In each second pin tumbler 87b, a shear line between the lock pin 89 and the plunger pin 91 is aligned with a shear line between the movable member 88 and the supporting member 90 when the card key 82 is not inserted into the lock apparatus 86.

Figure 13:
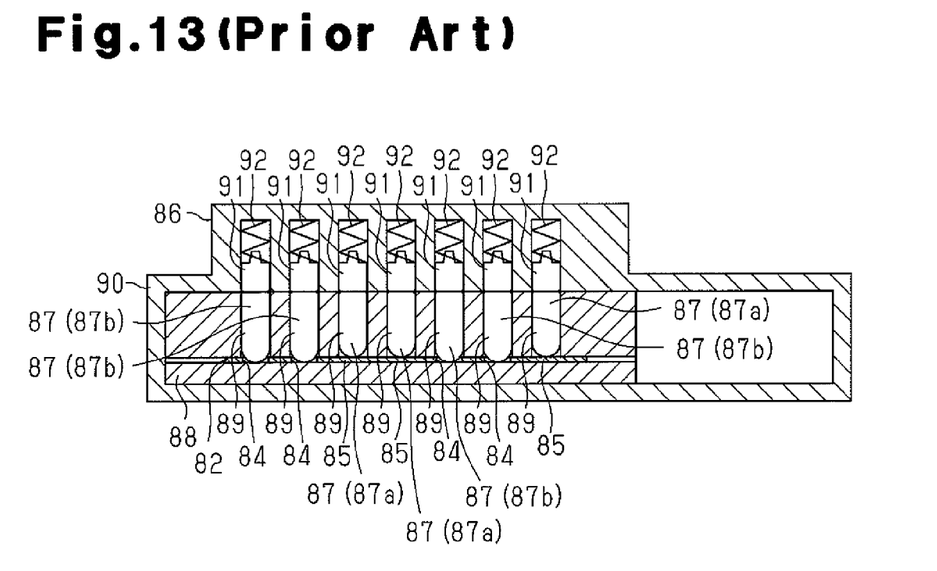
FIG. 13 is a cross-sectional view of the lock apparatus with an improper card key in the prior art.

As illustrated in FIG. 13, when the proper card key 82 is inserted into the lock apparatus 86, the shear line between the lock pin 89 and the plunger pin 91 is aligned with the shear line between the movable member 88 and the supporting member 90 in each of the pin tumblers 87 (first pin tumblers 87a and second pin tumblers 87b). This permits movement of the movable member 88 with respect to the supporting member 90 so that closing and opening of the lock apparatus 86 becomes possible.

Figure 12:
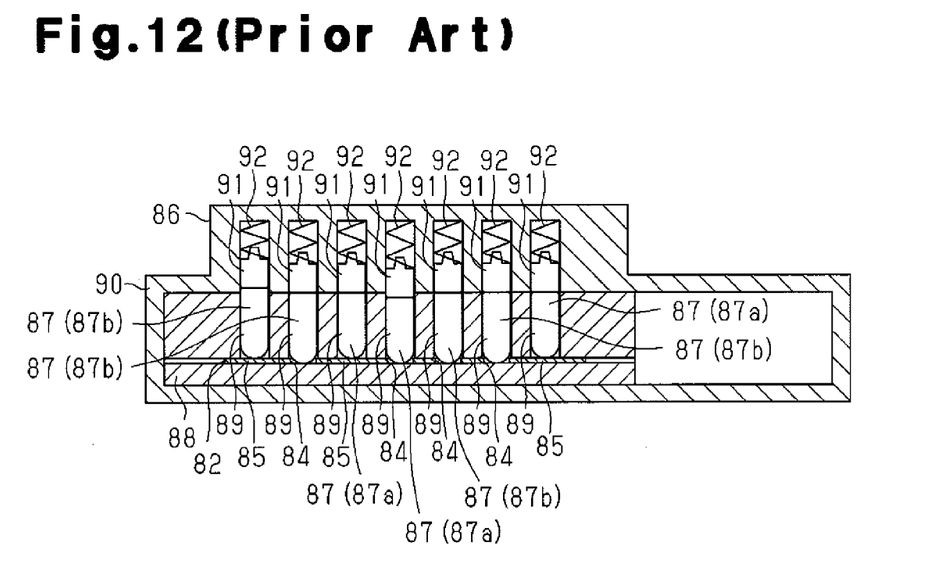
FIG. 12 is a cross-sectional view of the lock apparatus with a proper card key in the prior art.

As illustrated in FIG. 12, if the card key 82 inserted into the lock apparatus 86 is an improper key, the holes 84 of the card key 82 may be aligned with the first pin tumblers 87a, and the second pin tumblers 87b may be aligned with non-hold portions 85 of the card key 82. In such a first pin tumbler 87a, the plunger pin 91 may be lowered by the amount the distal end of the lock pin 89 is accommodated in the hole 84. Thus, the plunger pin 91 would be engaged with both of the movable member 88 and the supporting member 90. In such a second pin tumbler 87b, the distal end of the lock pin 89 may be lifted by the non-hold portion 85 of the card key 82. Thus, the lock pin 89 would be engaged with both of the movable member 88 and the supporting member 90. As a result, the pin tumblers 87 prohibit movement of the movable member 88 relative to the supporting member 90. Thus, the opening and closing of the lock apparatus 86 cannot be performed with an improper key.

[Patent Document 1] Japanese Utility Model Registration No. 3090369

[Patent Document 2] Japanese Laid-Open Patent Publication No. 2004-76375

SUMMARY OF THE INVENTION

The card key 82 includes a widthwise direction (as indicated by arrow Z1 in FIG. 10) and a lengthwise direction (as indicated by arrow Z2 in FIG. 10). The holes 84 and the non-hold portions 85 are arranged along a plurality of straight lines that are parallel to the widthwise direction of the card key 82 (direction indicated by arrow Z1 in FIG. 10). Further, the holes 84 and the non-hold portions 85 are arranged along a plurality of straight lines that are parallel to the lengthwise direction of the card key 82 (direction indicated by arrow Z2 in FIG. 10). To perform locking or unlocking with the card key system 81, the card key 82 is inserted into the lock apparatus 86 in a direction parallel to the lengthwise direction. Then, the card key 82 is linearly moved in a direction parallel to the widthwise direction to linearly move the movable member 88 of the lock apparatus 86.

Figure 14:
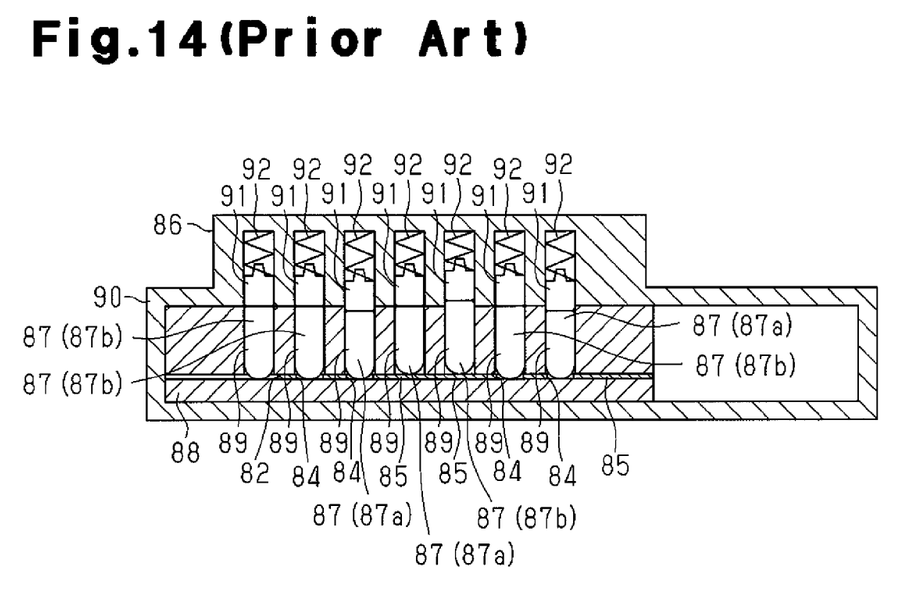
FIG. 14 is a cross-sectional view of the lock apparatus in an open state with the card key displaced therein in the prior art.

When a user tries to linearly move the movable member 88 of the lock apparatus 86 with the card key 82, excessive force may be applied to the card key 82. In such a case, the card key 82 may move alone without moving the movable member 88 depending on the how strong the force is (refer to FIG. 14). Such a state is referred to as key displacement. When a key displacement occurs, some of the first pin tumblers 87a may enter the holes 84 of the card key 82. As a result, in such first pin tumblers 87a, the plunger pins 91 engages with and locks the supporting member 90 and the movable member 88. Furthermore, when a key displacement occurs, some of the second pin tumblers 87b may be aligned with the non-hold portions 85 of the card key 82. As a result, in such second pin tumblers 87b, the lock pins 89 engages with and locks the supporting member 90 and the movable member 88.

In this manner, when a key displacement occurs and some of the first pin tumblers 87a and second pin tumblers 87b are in a locking state, a relatively large amount of the pin tumblers 87 are in the locking state. In such a case, the user would try to move the card key 82 back to its regular position from the displaced position. However, since many of the pin tumblers 87 are in the locking state, it is difficult to move the card key 82 back to its regular position.

Further, in the example of FIG. 10, when inserting the card key 82 into the lock apparatus 86, the pin tumblers 87 of the lock apparatus 86 are sequentially fitted to the holes 84 that are arranged along straight lines parallel to the lengthwise direction Z2. Each pin tumbler 87 is associated with one of the holes 84 (associated hole) or one of the non-hold portions 85 (associated hold portion) during verification of the key code pattern. However, during insertion of the card key 82 into the lock apparatus 86, the pin tumbler 87 passes by holes 84 and non-hold portions 85 with which the pin tumbler 87 is not associated. Whenever passing by such a non-associated hole 84, the pin tumbler 87 is fitted therein. Thus, the pin tumbler 87 moves upward and downward whenever fitted to a non-associated hole 84. This shortens the durability of the pin tumbler 87 and causes an awkward feel when the card key 82 is inserted into and removed from the lock apparatus.

Additionally, when moving the movable member 88 of the lock apparatus 86 with the card key 82, the movement of the movable member 88 is stopped whenever the pin tumblers 87 of the lock apparatus 86 are fitted to the holes 84, which are arranged along straight lines parallel to the widthwise direction Z1 of the card key 82.

The present invention is directed to a mechanical key code verification system in which unnecessary engagement of tumblers in a lock apparatus with recessed portions of a mechanical key is prevented.

One aspect of the present invention is a mechanical key code verification system including a mechanical key and a lock apparatus into which the mechanical key is insertable. The mechanical key includes a key body having at least one plane. A key code pattern is formed on the at least one plane of the key body and including a plurality of recessed portions and a plurality of non-recessed portions. The mechanical key is operated in key manipulation directions. The lock apparatus includes a plurality of tumblers each associated with one of the plurality of recessed portions and plurality of non-recessed portions in the key code pattern. A plurality of biasing members respectively bias the plurality of tumblers. The lock apparatus mechanically verifies the key code pattern when the mechanical key is inserted therein based on whether or not the plurality of tumblers are aligned with the associated ones of the plurality of recessed portions and plurality of non-recessed portions. The plurality of recessed portions and the plurality of non-recessed portions in the key code pattern are deviated from the key manipulation directions of the mechanical key.

In one embodiment, the mechanical key is moved in a key insertion-removal direction and a movable member operation direction. The plurality of recessed portions in the key code pattern is deviated from at least one of the key insertion-removal direction and the movable member operation direction.

In one embodiment, the recessed portions and the non-recessed portions are arranged along a plurality of lines not parallel to the key manipulation directions.

In one embodiment, the plurality of recessed portions and plurality of non-recessed portions in the key code pattern are arranged along a plurality of inclined lines which are inclined relative to the key manipulation directions.

In one embodiment, the mechanical key code verification system is a mechanical operation type key system arranged in a vehicle and including an electronic key system which verifies an electronic key code transmitted through wireless communication from an electronic key.

In one embodiment, the lock apparatus includes a support member; and a movable member which is movable relative to the support member. Each of the tumblers is a pin tumbler including a first lock pin arranged in the movable member and a second lock pin arranged in the support member, in which the mechanical verification of the key code pattern is established thereby enabling the movable member to be movable when a shear line between the first lock pins and the second lock pins of the plurality of pin tumblers in the lock apparatus is aligned with a shear line between the movable member and the support member in the lock apparatus.

In one embodiment, the plurality of recessed portions in the key code pattern are through holes.

In one embodiment, the mechanical key is a card key.

In one embodiment, the mechanical key is operable in a key insertion-removal direction and a movable member operation direction. The plurality of recessed portions in the key code pattern is arranged on a plurality of inclined row lines, which are inclined relative to the key insertion-removal direction, and a plurality of inclined column lines, which are inclined relative to the movable member operation direction.

In one embodiment, the plurality of recessed portions in the key code pattern are arranged at intersections of the plurality of inclined row lines and the plurality of inclined column lines.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of a mechanical key code verification system according to the present invention will now be discussed with reference to FIGS. 1 to 9.

Figure 1:
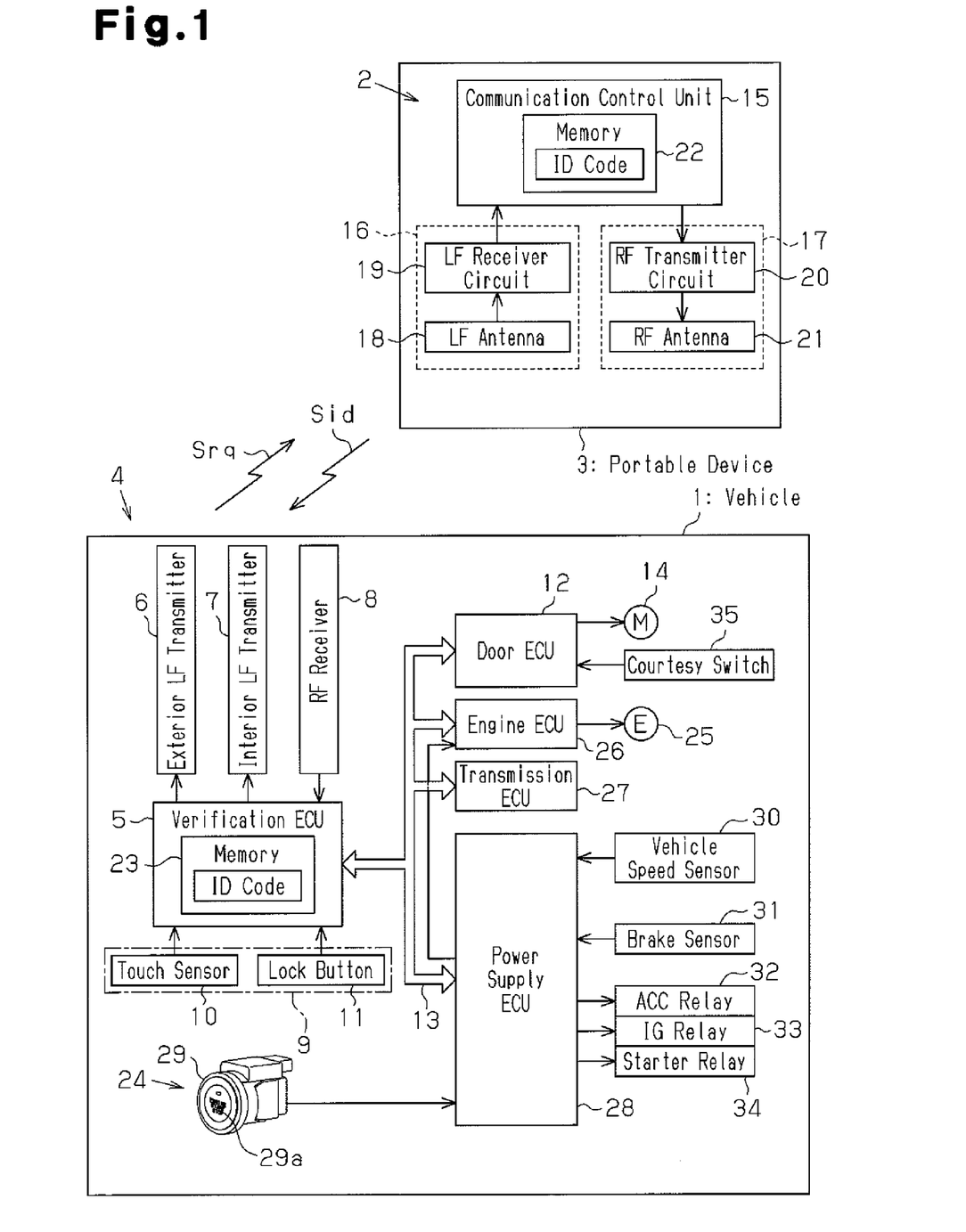
FIG. 1 is a block diagram of a key operation-free system.

As illustrated in FIG. 1, a vehicle 1 incorporates a key operation-free system 2 that performs vehicle operations including the locking and unlocking of the doors and the starting and stopping of the engine without physically operating a vehicle key. The key operation-free system 2 uses a vehicle key (hereinafter referred to as portable device 3) that transmits a unique ID code (key code) through wireless communication. In the key operation-free system 2, the vehicle 1 transmits a request signal Srq requesting the ID code. The portable device 3 returns an ID signal Sid including the ID code to the vehicle 1 through narrow-band wireless communication in response to the request signal Srq. If the ID code of the portable device 3 matches an ID code of the vehicle 1, the key operation-free system 2 enables the locking and unlocking of the door and the starting and stopping of the engine. The key operation-free system 2 is one example of an electronic key system, and the portable device 3 is one example of an electronic key.

The key operation-free system 2 incorporates a smart entry system 4 that locks and unlocks the doors without any physical operation of the vehicle key. The smart entry system 4 will now be described. The vehicle 1 includes a verification ECU 5 for verifying the ID code of the portable device 3 in the ID signal Sid received through narrow-band wireless communication. The verification ECU 5 is connected to a vehicle exterior LF transmitter 6, a vehicle interior LF transmitter 7, and an RF receiver 8. The vehicle exterior LF transmitter 6 is arranged in each door of the vehicle 1 to transmit a long frequency (LF band) signal out of the vehicle through wireless communication. The vehicle interior LF transmitter 7 is arranged in the vehicle (e.g., in the floor etc.) to transmit a LF band signal within the vehicle through wireless communication. The RF receiver 8 is arranged in the vehicle (e.g., in the rearview mirror etc.) to receive an RF band signal through wireless communication. The LF transmitters 6 and 7 transmit the request signal Srq through wireless communication. Specifically, the vehicle exterior LF transmitter 6 forms a communication area (vehicle exterior communication area) for the request signal Srq around the vehicle. The vehicle interior LF transmitter 7 forms a communication area (vehicle interior communication area) for the request signal Srq throughout the entire vehicle interior.

Figure 2:
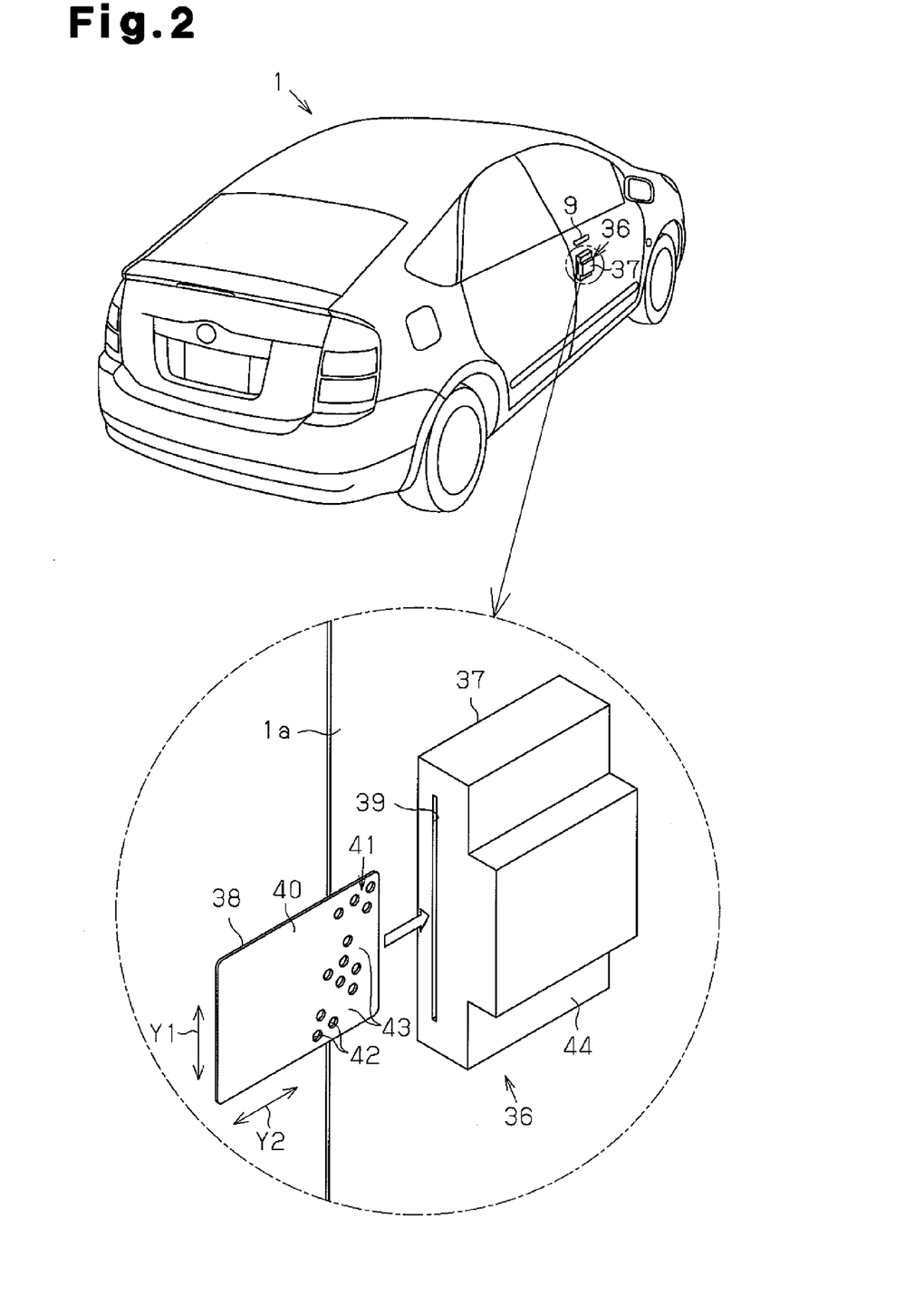
FIG. 2 is a perspective view showing a lock apparatus and a card key for a mechanical operation type door lock system.

The verification ECU 5 is connected to a touch sensor 10 arranged, for example, in a door handle 9 at the outer side of the vehicle (refer to FIG. 2). The touch sensor 10 detects a person touching the door handle 9 when the door is locked to unlock the door. The verification ECU 5 is connected to a lock button 11 arranged in, for example, the door handle 9. The lock button 11 is pushed to lock the unlocked door. The verification ECU 5 is connected to a door ECU 12, which controls the locking and unlocking of the door though an in-vehicle LAN 13. The door ECU 12 locks or unlocks the door by driving a door lock motor 14 in accordance with a command from the verification ECU 5.

The portable device 3 includes a communication control unit 15 for controlling wireless communication that is performed with the vehicle 1. The communication control unit 15 is connected to an LF reception unit 16, which receives an LF band signal, and an RF transmission unit 17, which transmits an RF band signal in accordance with a command from the communication control unit 15. The LEF reception unit 16 demodulates an LF band signal, which is received by an LF reception antenna 18 in an LE receiver circuit 19, and provides the demodulated signal to the communication control unit 15 as received data. The RF transmission unit 17 modulates transmission data provided from the communication control unit 15 with an RF transmitter circuit 20, generates the ID signal Sid in the RF band with the unique ID code of the portable device 3, and transmits the ID signal Sid from an RF transmission antenna 21.

When the vehicle 1 is in a parked state (engine stopped and doors locked), the verification ECU 5 intermittently transmits the request signal Srq in the LE band to the vehicle exterior LF transmitter 6 and forms the vehicle exterior communication area around the vehicle. When the portable device 3 enters the vehicle exterior communication area and receives the request signal Srq with the LF reception unit 16, the portable device 3 transmits the ID signal Sid containing the ID code registered in a memory 22 to the REF transmission unit 17 as the RF band wireless signal in response to the request signal Srq. In the verification ECU 5, the ID code of the portable device 3 contained in the ID signal Sid and received by the RF receiver 8 is verified with the ID code registered in a memory 23 (vehicle exterior verification). When the vehicle exterior verification is completed, the verification ECU 5 sets a vehicle exterior verification flag in the memory 23 over a fixed time period and activates the touch sensor 10 in a standby state during that time period. When the activated touch sensor 10 detects that the vehicle exterior door handle has been touched, the door ECU 12 unlocks the locked door by generating rotation with the door lock motor 14 in one direction.

In a state in which the vehicle 1 is not moving (engine stopped and door unlocked), the verification ECU 5 transmits the request signal Srq to the vehicle exterior LF transmitter 6 when detecting that the lock button 11 has been pushed. The verification ECU 5 performs the vehicle exterior verification on the ID signal Sid returned from the portable device 3 in response to the request signal Srq. The verification ECU 5 provides a door lock request to the door ECU 12 when the vehicle exterior verification is completed. The door ECU 12 locks the unlocked door by generating rotation with the door lock motor 14 in the other direction in response to the door lock request.

The key operation-free system 2 includes a one-push engine start system 24 enabling the starting and stopping of the engine by just operating a vehicle switch. Physical operation of the vehicle key is not necessary. The one-push engine start system 24 will now be described. The vehicle 1 includes an engine ECU 26 that executes ignition control and fuel injection control on an engine 25, a gearshift ECU 27 that controls automatic transmission according to the operation of a gearshift lever, and a power supply ECU 28 that executes power supply management for in-vehicle electrical components. The ECUs 26 to 28 are connected to various ECUs including the verification ECU 5 through the in-vehicle LAN 13.

An engine switch 29, which is operated when switching the power supply state of the vehicle 1, is arranged near the driver's seat in the vehicle 1. The engine switch 29 is of a push-operation type and includes a switch portion 29a that is pushed. The engine switch 29 is connected to the power supply ECU 28 by a harness. The engine switch 29 has an engine starting and stopping operation function, which switches the engine 25 to a started state or a stopped state, and a power supply transition operation function, which switches the power supply state of the vehicle 1 to an OFF state, an ACC ON state, or an IG ON state.

The power supply ECU 28 is connected to a vehicle speed sensor 30, which detects the travel speed of the vehicle 1, and a brake sensor 31, which detects the depression amount of the brake pedal. The power supply ECU 28 recognizes the current traveling speed of the vehicle 1, which is based on the vehicle speed information from the vehicle speed sensor 30, and determines depression of the brake pedal, which is based on the pedal depression amount information from the brake sensor 31. The power supply ECU 28 is connected to an ACC relay 32, which is connected to various in-vehicle accessories, an IG relay 33, which is connected to the engine ECU 26, and a starter relay 34, which is connected to a starter motor of the engine 25.

After the vehicle exterior verification is completed and the door is unlocked, the verification ECU 5 recognizes via a courtesy switch 35 that the driver is entering the vehicle as the door opens. The verification ECU 5 forms the vehicle interior communication area in the entire vehicle interior by transmitting the request signal Srq to the vehicle interior LF transmitter 7. When receiving the ID signal Sid in response from the portable device 3, which is located in the vehicle interior communication area, with the RF receiver 8 (vehicle interior verification), the verification ECU 5 verifies the ID code of the portable device 3 contained in the ID signal Sid with the ID code registered in the verification ECU 5. The verification ECU 5 sets a vehicle interior verification completion flag in the memory 23 when the vehicle interior verification is completed.

When the driver pushes the engine switch 29 to switch the power supply state of the vehicle 1, the power supply ECU 28 first checks the verification ECU 5 and determines whether the vehicle interior verification has been completed. The power supply ECU 28 recognizes that the vehicle interior verification has been completed when notified by the verification ECU 5 that the vehicle interior verification has been completed. When notified by the verification ECU 5 that the vehicle interior verification has not been satisfied, the power supply ECU 28 instructs the verification ECU 5 to re-execute the vehicle interior verification and re-check whether the vehicle interior verification has been completed. The power supply ECU 28 continues to determine that the vehicle interior verification has not been completed even after the verification ECU 5 re-executes the vehicle interior verification unless notified by the verification ECU 5 that the vehicle interior verification has been completed.

When the engine switch 29 is pushed in a state in which the brake pedal is depressed and the engine 25 is stopped, the power supply ECU 28 activates the three relays 32 to 34 to start the engine 25 as long as the vehicle interior verification is satisfied and then outputs an activation signal to the engine ECU 26. When receiving the activation signal, the engine ECU 26 checks the result of the vehicle interior verification and then checks whether the verification ECU 5 and the engine ECU 26 are a proper pair by performing pairing through encryption communication. If the two conditions are satisfied, the engine ECU 26 initiates the ignition control and the fuel injection control to start the engine 25. In a state in which the vehicle 1 stops moving (vehicle speed "0") and the engine switch 29 is pushed while the engine 25 is still running, the power supply ECU 28 deactivates all of the three relays 32 to 34 to stop the engine 25.

When the engine switch 29 is pushed but the brake pedal is not depressed in a situation in which the conditions are met of the engine 25 being stopped, the vehicle interior verification being completed, and the gearshift lever being at the P range position, the power supply ECU 28 sequentially shifts the power supply state in a manner of OFF state→ACC ON state→IG ON state→OFF state whenever the engine switch 29 is pushed. In the above situation, the power supply state of the vehicle 1 is switched from the OFF state to the ACC state when the engine switch 29 is pushed once. From this state, the power supply state of the vehicle 1 is switched to the IG ON state when the engine switch 29 is pushed again once. From this state, the power supply state of the vehicle 1 returns to the OFF state when the engine switch 29 is pushed again once.

A mechanical key code verification system, or mechanical operation type door lock system 36, illustrated in FIG. 2 will now be discussed. The mechanical operation type door lock system 36 is advantageous when a physical key operation with a mechanical key becomes necessary to lock or unlock the doors. Since the smart entry system 4 (key operation-free system 2) is of an electrical type, a door cannot be locked or unlocked by the smart entry system 4 if the smart entry system 4 fails to function or if battery drainage occurs in the portable device 3. The mechanical operation type door lock system 36 is used to enable the locking and unlocking of the doors under such situation.

The mechanical operation type door lock system 36 includes a lock apparatus 37, which is attached to an outer wall of the vehicle door (driver's seat door) 1a, and a mechanical key 38. The mechanical key 38 is inserted into the lock apparatus 37 and physically operated to open (unlock state) or close (lock state) the lock apparatus 37. In the preferred embodiment, the mechanical key 38 is of a card type (flat plate-shape) and is thus also referred to as the card key 38. The mechanical operation type door lock system 36 may be referred to as a card key type door lock system. In a state in which the proper card key 38 is inserted into a key hole 39 of the lock apparatus 37, the door is locked by moving the card key 38 from the initial position in a first direction (e.g., upward direction). In a state in which the proper card key 38 is inserted into the key hole 39 of the lock apparatus 37, the door is unlocked by moving the card key 38 from the initial position in a second direction (e.g., downward direction).

The mechanical operation type door lock system 36 is used during an emergency such as when the smart entry system 4 fails to function or when battery drainage occurs in the portable device 3. The card key 38 is used as an emergency key during such an emergency. The card key 38 is flat and has a size similar to that of a typical credit card. Thus, the card key 38 can be carried in a wallet, a card case, and the like in the same manner as credit cards.

As illustrated in FIG. 2, a key body 40 (also referred to as case portion) of the card key 38 has a key code pattern 41 defined on at least one surface, such as a main surface, of the card key 38. One or more recessed portions and one or more non-recessed portions are formed in the key code pattern 41. The array (pattern) of the holes 42 and the non-hole portions 43 in the key code pattern 41 expresses the key code for the card key 38 of the mechanical operation type door lock system 36.

The recessed portions in the key code pattern 41 are holes 42 arranged in the main surface of the key body 40. The non-recessed portions are non-hole portions 43 defined in the main surface of the key body 40 at portions that do not include the holes 42. The key code pattern 41 is arranged near the distal end of the key body 40. Each hole 42 can be a round through hole, such as a punched hole, extending through the key body 40 but it does not necessary have to be round. The non-hole portions 43 may be projections. The holes 42 are one example of recessed portions. The non-hole portions 43 are one example of non-recessed portions.

Referring to FIGS. 3 to 7, the lock apparatus 37 includes a slider case 44. The slider case 44 is the body portion of the lock apparatus 37 and is box-shaped. The key hole 39 (see FIG. 2) is formed in a side wall of the slider case 44. The slider case 44 is attached to the outer wall of the vehicle door 1a. A slider 45 is accommodated in an accommodating space 44a of the slider case 44 so as to be movable (linearly movable) relative to the slider case 44. The slider 45 is formed by a plate. The slider 45 is movable in an R1 direction (FIG. 5) and an R2 direction (FIG. 6) in the accommodating space 44a of the slider case 44. The slider case 44 is one example of a support member, and the slider 45 is one example of a movable member. The slider case 44 may be referred to as a fixed side of the lock apparatus 37, and the slider 45 may be referred to as a movable side of the lock apparatus 37.

The card key 38 when inserted into the key hole 39 is received in a key slot 45a, which is formed in the slider 45. The key slot 45a has dimensions that are slightly greater than the width and thickness of the card key 38 so as to enable smooth insertion of the card key 38. The key slot 45a includes a wide inlet (located at the left side as viewed in FIG. 7) to facilitate insertion of the card key 38. The key slot 45a includes a narrow inner end (located at the right side as viewed in FIG. 7) to position the card key 38 relative to the slider 45. The key slot 45a may include a sloped surface to position the card key 38. The innermost part of the key slot 45a may be open or closed.

As shown in FIGS. 3 to 7, pin tumblers 46 are arranged between the slider case 44 and the slider 45 to fix the slider 45 to the slider case 44 and disable the locking and unlocking operation when the proper card key 38 is not used. The plurality of pin tumblers 46 each face one of the holes 42 or the non-hole portions 43 when the card key 38 is inserted into the lock apparatus 37. Thus, the quantity of the pin tumblers 46 is the same as the total quantity of the holes 42 and non-hole portions 43 in the card key 38. For example, there are twenty-one pin tumblers 46 when there are thirteen holes 42 and eight non-hole portions 43. The pin tumblers 46 are one example of tumblers.

Figure 3:
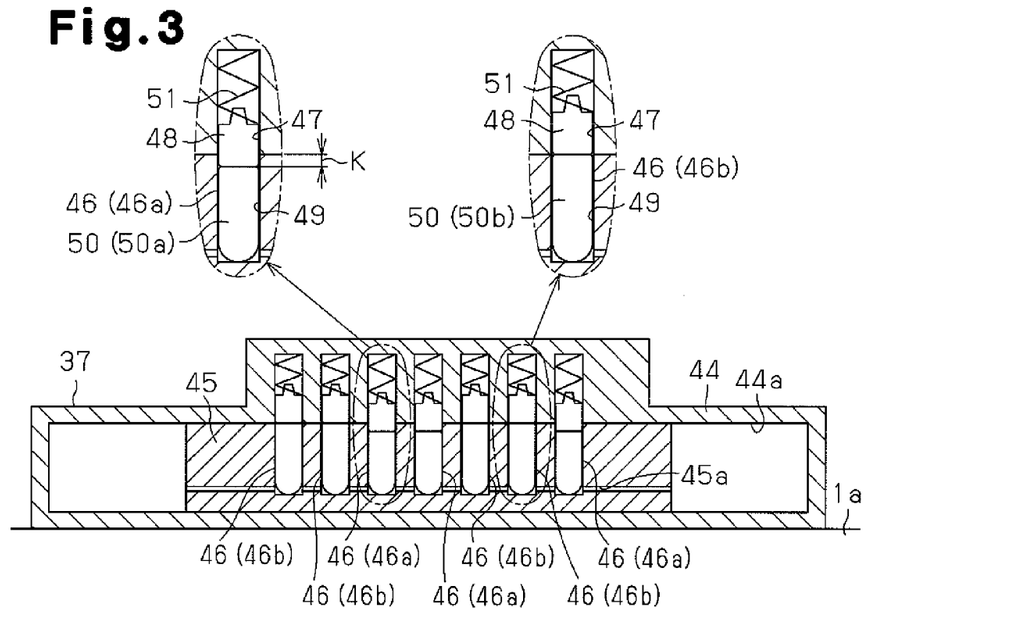
FIG. 3 is a cross-sectional view of the lock apparatus without the card key.

As illustrated in FIG. 3, each pin tumbler 46 includes a plunger pin 48 (second lock pin), which is movably accommodated in a case side accommodation hole 47 formed in the slider case 44, and a lock pin 50 (first lock pin), which is movably accommodated in a slider side accommodation hole 49 formed in the slider 45. The pin tumbler 46 is constantly biased toward the slider 45 by a tumbler spring 51 accommodated in the case side accommodation hole 47. The lock pin 50 is longer than the plunger pin 48. The lock pin 50 has a distal end formed by a round surface, for example, a semispherical surface. The tumbler spring 51 is one example of a biasing member.

The pin tumbler 46 includes one or more first pin tumblers 46a, in which the lock pin 50 is short, and one or more second pin tumblers 46b, in which the lock pin 50 is long.

Figures 4A, 4B, 4C:
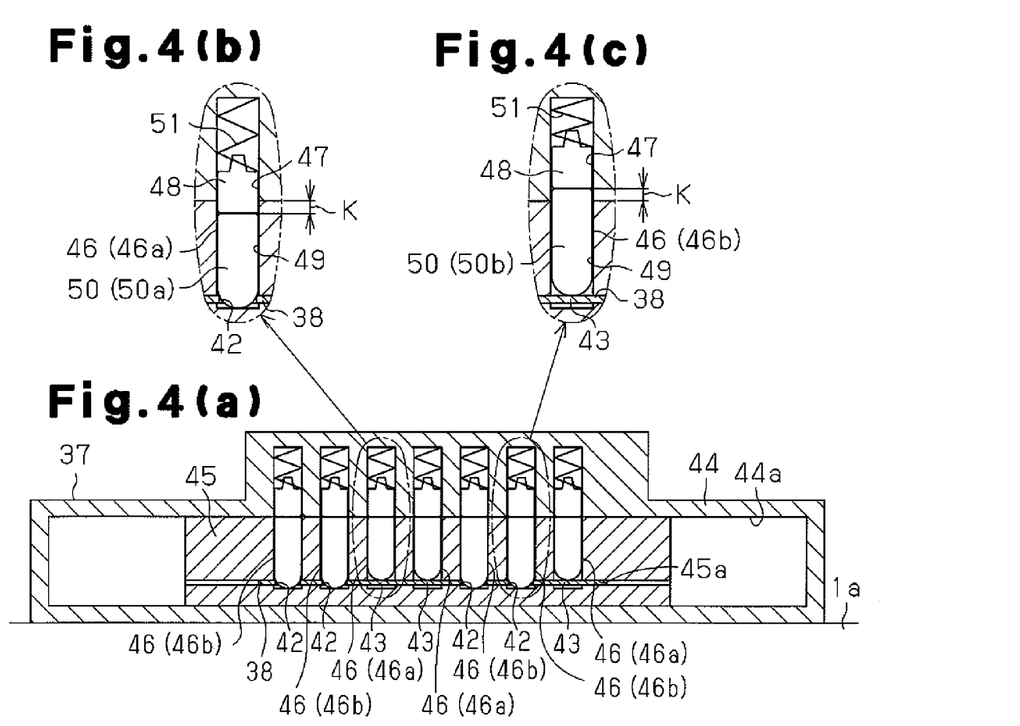
FIG. 4(a) is a cross-sectional view of the lock apparatus together with a proper card key.
FIGS. 4(b) and 4(c) are partial enlarged views of the lock apparatus together with an improper card key.

The first pin tumblers 46a are located at positions corresponding to the non-hole portions 43 of the proper card key 38 that is inserted into the lock apparatus 37. When the card key 38 is not inserted into the lock apparatus 37 as illustrated in the state of FIG. 3 or when the first pin tumblers 46a are forced into the holes 42 of an improper card key 38 as illustrated in the state of FIG. 4(b), the plunger pin 48 of each first pin tumbler 46a engages both the slider case 44 and the slider 45 over a constant engagement length K (pin tumbler locking state) and restricts movement of the slider 45. When the proper card key 38 is inserted into the lock apparatus 37 as illustrated in the state of FIG. 4(a), the first pin tumblers 46a are moved upward by an amount corresponding to the engagement length K against the biasing force of the corresponding tumbler springs 51 by the non-hole portions 43 of the card key 38. The shear line between the plunger pin 48 and the lock pin 50 of each first pin tumbler 46a (shear line between the two components of the plunger pin 48) becomes aligned with the shear line between the slider case 44 and the slider 45 (slide surface of the slider 45) (pin tumbler unlocking state). The first pin tumblers 46a in the pin tumbler unlocking state do not function to restrict movement of the slider 45.

The second pin tumblers 46b are located at positions corresponding to the holes 42 of the proper card key 38 that is inserted into the lock apparatus 37. When the card key 38 is not inserted into the lock apparatus 37 as illustrated in the state of FIG. 3 or when the second pin tumblers 46b are forced into the holes 42 of the proper card key 38 as illustrated in FIG. 4 (a), the shear line between the plunger pin 48 and the lock pin 50 of each second pin tumbler 46b is aligned with the shear line between the slider case 44 and the slider 45 (pin tumbler unlocking state). The second pin tumblers 46b in the pin tumbler unlocking state do not function to restrict movement of the slider 45. When an improper key is inserted into the lock apparatus 37 as illustrated in the state of FIG. 4(c), the second pin tumblers 46b are forced upward against the biasing force of the corresponding tumbler springs 51 by the non-hole portions 43. The second pin tumblers 46b engage both the slider case 44 and the slider 45 (pin tumbler locking state) and restrict movement of the slider 45. The lift amount of each second pin tumbler 46b is the engagement length K of the lock pin 50 in each second pin tumbler 46b.

Figure 5:
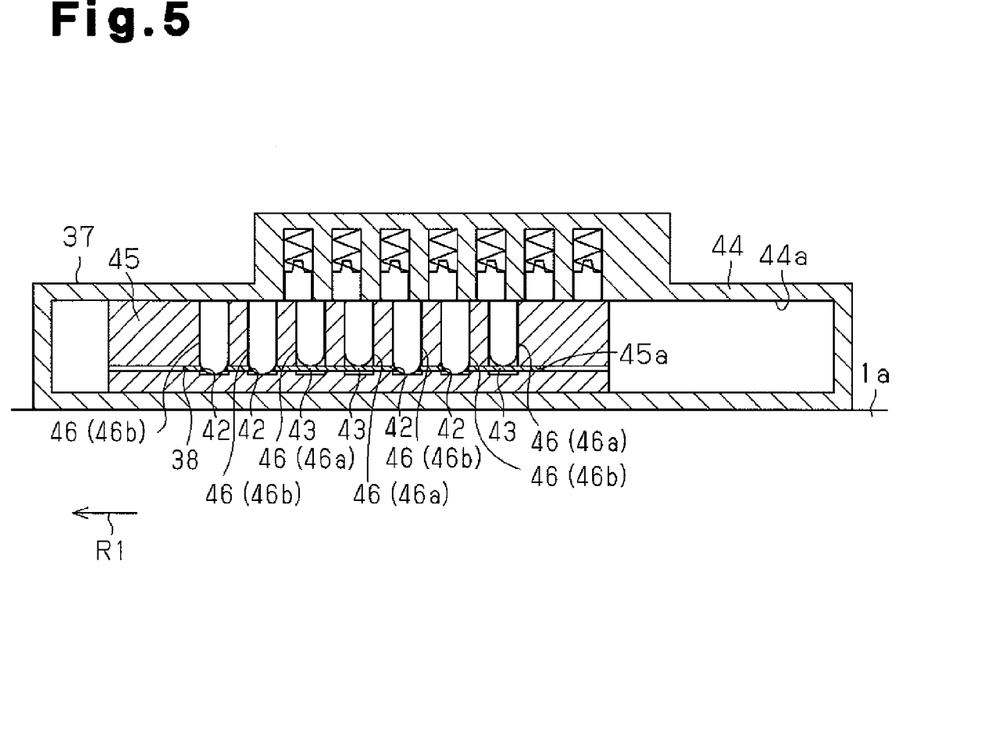
FIG. 5 is a cross-sectional view of the lock apparatus when opened by the card key.
Figure 6:
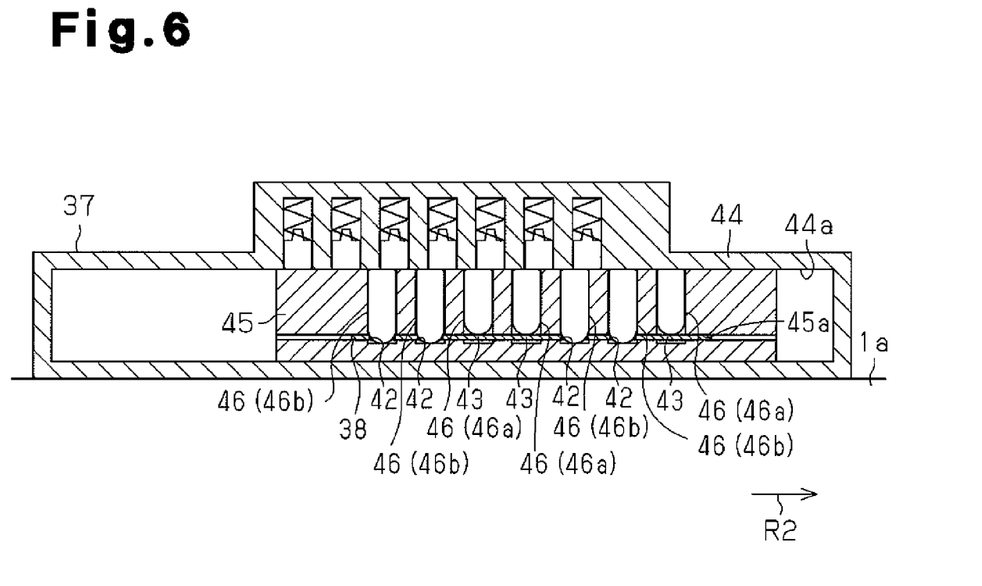
FIG. 6 is a cross-sectional view of the lock apparatus when closed by the card key.

The slider 45 is connected to a dead bolt (not shown) or the door lock member of the vehicle door 1a by a transmission mechanism (not shown). The transmission mechanism transmits and converts the movement of the slider 45 to the mechanical opening and closing of the dead bolt. Referring to FIGS. 5 and 6, when the card key 38 is inserted into the lock apparatus 37, the slider 45 becomes movable in two directions from a neutral position. When the slider 45 is moved in one direction (direction of arrow R1 in FIG. 5) from the neutral position, the transmission mechanism converts the movement of the slider 45 to a projection operation of the dead bolt to unlock the vehicle door 1a. When the slider 45 is moved in the other direction (direction of arrow R2 in FIG. 6) from the neutral position, the transmission mechanism converts the movement to a retraction operation of the dead bolt to lock the vehicle door 1a.

As shown in the state of FIG. 4(a), when the card key 38 is moved from the neutral position to a predetermined position in the slider (e.g., innermost position), the pin tumblers 46 (lock pins) are all aligned with either the holes 42 or the non-hole portions 43.

Figure 7:
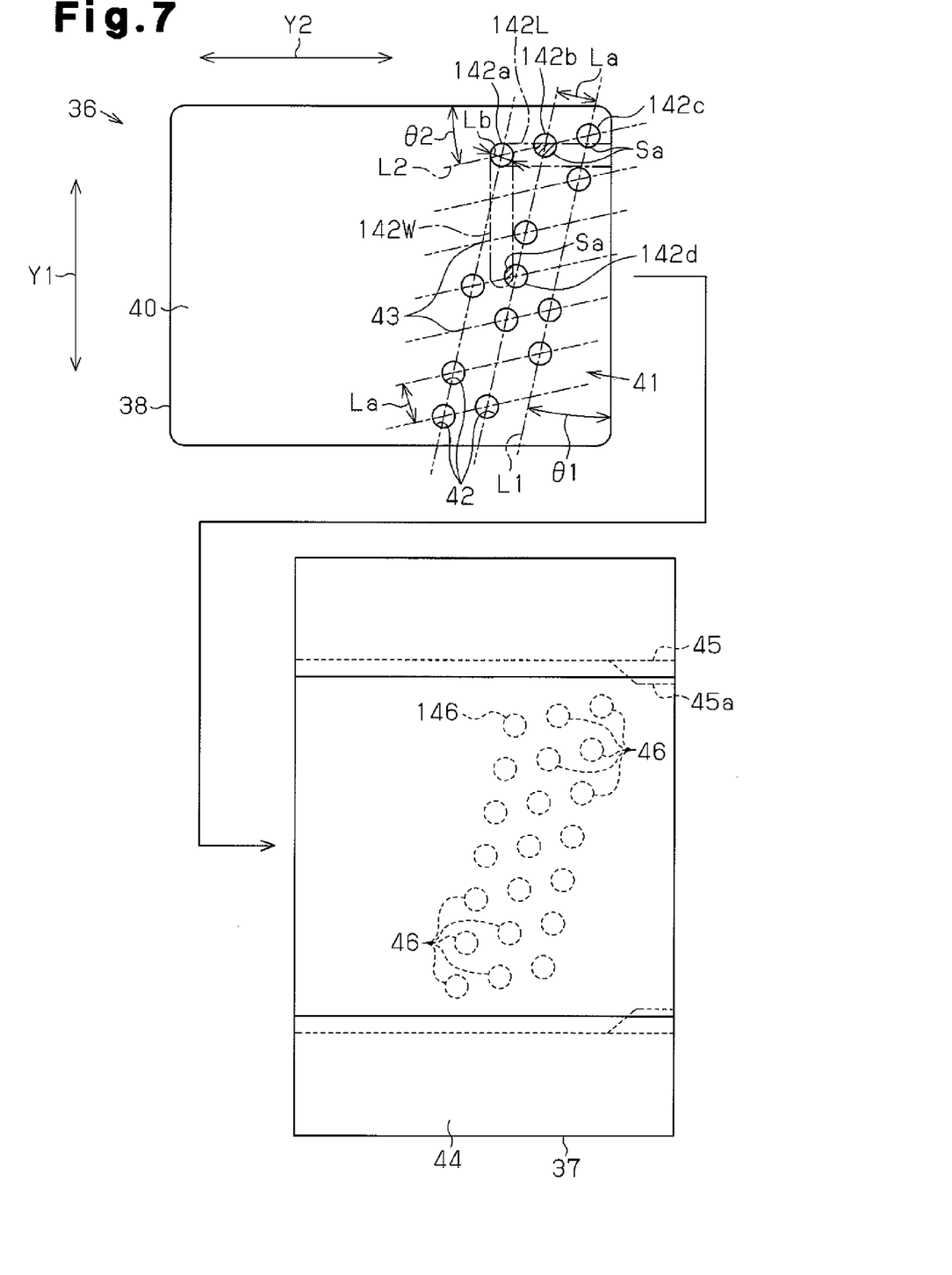
FIG. 7 is a plan view showing a key code pattern of the card key and the positions of tumblers.
Figure 8:
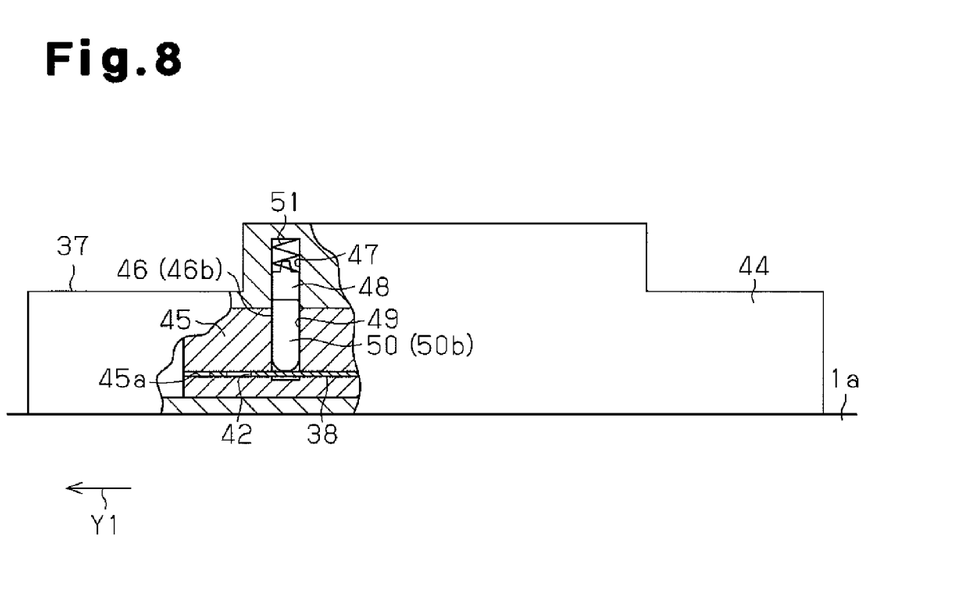
FIG. 8 is a partial cross-sectional view showing the lock apparatus in a closed state with the card key displaced in the slider.
Figure 9:
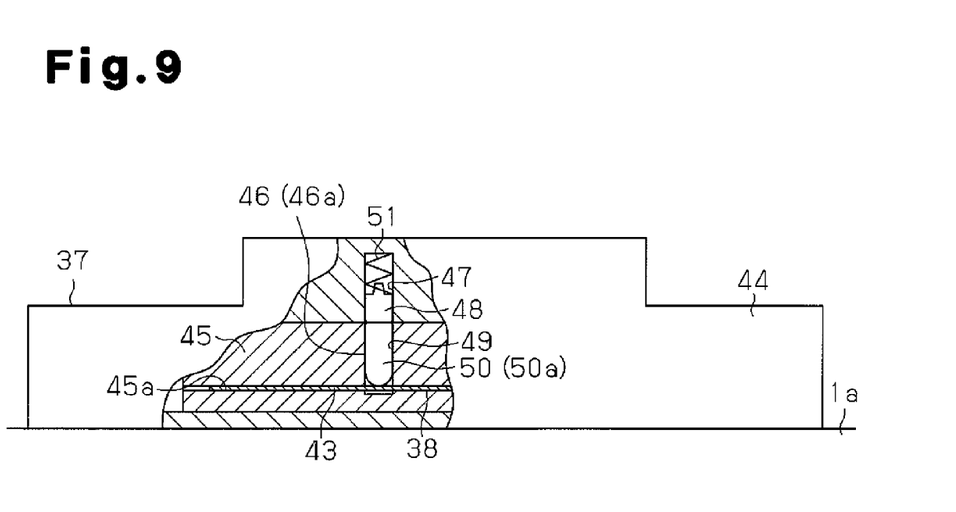
FIG. 9 is a partial cross-sectional view showing the lock apparatus in an open state with the card key displaced in the slider.

When the card key 38 is being inserted into the lock apparatus 37 as shown in the state of FIG. 7 or when the slider 45 is being moved with the card key 38 as shown in the state of FIG. 8, the card key 38 is separated from the predetermined position in the slider. The key code pattern 41 is formed so that the axis of each pin tumbler 46 is not aligned with the axis (center) of any of the holes 42 as long as the card key 38 is displaced and separated from the predetermined position in the slider 45. Thus, when the card key 38 is being inserted into the lock apparatus 37 as shown in the state of FIG. 7 or when the slider 45 is being moved with the card key 38 as shown in the state of FIG. 8, the pin tumblers 46 (lock pins 50) enters only the associated hole 42 and does not enter any other hole 42 (non-associated hole or non-associated recessed portion).

The key code pattern 41 will now be discussed in detail.

As described above, referring to FIG. 7, the card key 38 is first inserted into the lock apparatus 37 in a key insertion-removal direction Y2 and then moved in a movable member operation direction Y1 to operate the slider 45. The movable member operation direction Y1 and the key insertion-removal direction Y2 are also each referred to as a key manipulation direction. In the key code pattern 41, the holes 42 and the non-hole portions 43 are arranged along a plurality of inclined lines L1, which are inclined at angle θ1 relative to the movable member operation direction Y1, and a plurality of inclined lines L2, which are inclined at angle θ2 relative to the key insertion-removal direction Y2. The inclined lines L1 and L2 are respectively referred to as inclined column lines and inclined row lines. The angles θ1 and θ2 are respectively referred to as a column inclination angle and a row inclination angle. The center of each hole 42 is located on the inclined lines L1 and L2.

When the card key 38 is moved in the key manipulation direction, the pin tumblers 46 do not enter the non-associated holes 42. However, the pin tumblers 46 may partially become overlapped with non-associated holes 42. This will now be discussed using a pin tumbler 146 (refer to FIG. 7) as a representative of the pin tumblers 46 and an associated hole 142a as a representative of the holes 42. The pin tumbler 146 is assigned to the associated hole 142a in the key code pattern 41.

When moving the card key 38 in the key insertion-removal direction Y2, the pin tumbler 146 remains in contact with the main surface of the card key 38 as it moves along the main surface (refer to track 142L). During the movement, the pin tumbler 146 does not enter each of non-associated holes 142b and 142c. Rather, the pin tumbler 146 merely becomes overlapped with each of the non-associated holes 142b and 142c over an overlapping area Sa (as shown by the hatched portions in FIG. 7). The key code pattern 41 is set so as to minimize the overlapping area Sa. The overlapping area Sa is set by setting the column inclination angle θ1, the row inclination angle θ2, the interval (hole distance) La between the inclined lines L1 or L2, and the hole diameter Lb of the holes 42. In the example of FIG. 7, the hole distance La is a fixed value, and the hole diameter Lb is a fixed value.

When the interval of the inclined lines L1 is the same as the interval of the inclined lines L2, intersections of the inclined lines L1 and the inclined lines L2 define vertexes of rhombuses. Such a key code pattern 41 is referred to as a rhombus-mesh layout. When the interval of the inclines lines L1 differs from the interval of the inclined lines L2, intersections of the inclined lines L1 and the inclined lines L2 define vertexes of parallelograms. Such a key code pattern 41 is referred to as a parallelogram-mesh layout. It is preferred that the center of each hole 42 be located at an intersection of the inclined lines L1 and L2.

In the lock apparatus 37, the pin tumblers 46 are each associated with one of the holes 42 and non-hole portions 43. Accordingly, in correspondence with the key code pattern 41, the pin tumblers 46 are arranged along a plurality of inclined lines that are inclined by angles 91 relative to the movable member operation direction Y1 and angle θ2 relative to the key insertion-removal direction Y2. The interval between the axes of the pin tumblers 46 is in correspondence with the hole distance La, and the diameter of the pin tumblers 46 is in correspondence with the hole diameter Lb.

The operation of the mechanical operation type door lock system 36 will now be discussed.

When a driver tries to enter the vehicle 1, which is in a parked state (engine stopped, door locked state), if the key operation-free system 2 fails to function or if battery drainage occurs in the portable device 3, the doors cannot be unlocked with the key operation-free system 2. In such a case, the driver unlocks the vehicle door 1a with the mechanical operation type door lock system 36. The driver may carry the card key 38 of the mechanical operation type door lock system 36 in a wallet, a card case, or the like. The driver inserts the card key 38 into the key hole 39 of the lock apparatus 37. The slider 45 is at the neutral position when the card key 38 is inserted into the lock apparatus 37.

As illustrated in the state of FIG. 3, when the card key 38 is not inserted into the lock apparatus 37, the second pin tumblers 46b are in the pin tumbler unlocking state. However, the first pin tumblers 46a are in the pin tumbler locking state. The first pin tumblers 46a restrict movement of the slider 45 relative to the slider case 44. Thus, the slider 45 cannot be moved even when a person inserts his or her fingers into the key hole 39 of the lock apparatus 37 to forcibly move the slider 45. In this manner, unauthorized opening and closing of the lock apparatus 37 is prevented.

When inserting the card key 38 into the key hole 39, the edge of the card key 38 enters the gap below the distal ends of the pin tumblers 46 and thereby lifts the pin tumbler 46.

When the card key 38 is being inserted into the lock apparatus 37, the axes of the pin tumblers 46 do not become aligned with the axes of the non-associated holes 42. Thus, the pin tumblers 46 are in contact with the main surface of the card key 38 but do not enter the non-associated holes 42. When the card key 38 reaches the predetermined position, the axes of the pin tumblers 46 are aligned with the axes of the associated holes 42. Thus, the pin tumblers 46 enter the associated holes 42. If the card key 38 is a proper key, the non-hole portions 43 of the card key 38 are located at positions corresponding to the first pin tumblers 46a, and the holes 42 of the card key 38 are located at positions corresponding to the second pin tumblers 46b, as shown in the state of FIG. 4(a).

If the card key 38 is a proper key, each first pin tumbler 46a is forced upward by a distance corresponding to the sum of the plate thickness of the card key 38 and the depth of the pin accommodation recess 56 by the corresponding non-hole portion 43 of the card key 38 against the biasing force of the tumbler spring 51. The shear line between the plunger pin 48 and the lock pin 50 of the first pin tumbler 46a is aligned with the shear line between the slider case 44 and the slider 45 (pin tumbler unlocking state). Each second pin tumbler 46b is fitted into the associated hole 42 of the card key 38 and thus forced towards the slider 45 by the tumbler spring 51, and the shear line between the plunger pin 48 and the lock pin 50 of the second pin tumbler 46b is aligned with the shear line between the slider case 44 and the slider 45 (pin tumbler unlocking state).

The first pin tumblers 46a and the second pin tumblers 46b are both in the pin tumbler unlocking state. Thus, the lock apparatus 37 is in a slider movable state in which the slider 45 is movable relative to the slider case 44. The slider 45 can be moved from the neutral position with the card key 38 when the lock apparatus 37 is in the slider movable state. Therefore, if the proper key 38 is inserted into the lock apparatus 37 and moved in one direction (direction of arrow R1 in FIG. 5) to move the slider 45 in that direction (as shown in the state of FIG. 5) and open the lock apparatus 37, such movement is transmitted to the dead bolt by the transmission mechanism. This retracts the dead bolt from a projected state and unlocks the vehicle door 1a.

The plunger pin 48 and the lock pin 50 of each of the pin tumblers 46 must be facing toward each other to enable upward and downward movements of the pin tumblers 46. That is, the card key 38 cannot be removed from the lock apparatus 37 unless the plunger pin 48 and the lock pin 50 of each pin tumbler 46 are facing each other. Therefore, after unlocking the vehicle door 1a, the driver returns the card key 38 to the initial position by moving the slider 45 to the neutral position to remove the card key 38 from the lock apparatus 37. The driver then pulls out the card key 38 from the lock apparatus 37 and enters the vehicle while holding the card key 38. The driver performs card key operations in this manner to enter the vehicle.

When locking the vehicle door 1a with the mechanical operation type door lock system 36, the proper card key 38 is inserted into the lock apparatus 37 in which the slider 45 is located at the neutral position. Then, the driver moves the card key 38 in the other direction (direction of arrow R2 of FIG. 6) to move the slider 45 in the other direction (state illustrated in FIG. 7). In this case, the movement of the slider 45 is transmitted to the dead bolt by the transmission mechanism. This projects the dead bolt from the retracted state to lock the vehicle door 1a. When removing the card key 38 from the lock apparatus 37 after locking the vehicle door 1a, the driver returns the card key 38 to the initial position by moving the slider 45 to the neutral position. Then, the driver pulls the card key 38 out from the lock apparatus 37 in the same manner as when unlocking the vehicle door 1a with the lock apparatus 37.

If excessive force (or speed) is applied to the card key 38 when linearly moving the slider 45, the card key 38 may move alone in the movable member operation direction Y1 without moving the slider 45 (FIG. 8).

However, the holes 42 and the non-hole portions 43 in the key code pattern 41 are arranged on the inclines lines L2, which are inclined relative to the movable member operation direction Y1. Thus, among the two types of lock pins 50a and 50b which have different lengths, the longer lock pins 50b (FIG. 8) are lifted by an amount corresponding to the thickness of the card key 38 and fitted into the case side accommodation holes 47 of the slider case 44. This shifts the lock pins 50b to the locking state. The shorter lock pins 50a (FIG. 9) slide along the main surface of the card key 38 and remain in the unlocking state.

The card key 38 may become displaced and separated from its regular position. In such a case, to return the card key 38 to the regular position, the card key 38 must be moved in a direction opposite the displacement direction so as to align the holes 42 of the card key 38 with the associated lock pins 50. Such alignment required high accuracy. Especially, when the card key 38 is displaced, the alignment becomes difficult when there are more lock pins that shift to the locked state. However, with regard to this aspect, in the key code pattern 41, the holes 42 are arranged along the inclined lines L1 and L2. Thus, when the card key 38 becomes displaced in an unexpected manner, among the two types of lock pins 50a and 50b (first plunger pins 46a and second plunger pins 46b) the shorter lock pins 50a do not enter the holes 42, that is, the lock pins 50a do not shift to the locking state. Thus, only the longer lock pins 50a, which were in the holes 42, are removed from the holes 42 and shift to the locking state. As a result, in comparison with the prior art in which two different types of lock pins having different lengths both shift to the locking state, the card key 38, when displaced, may be more easily returned to its regular position.

Further, the holes 42 and the non-hole portions 43 of the card key 38 are arranged along the inclined lines L2, which are inclined relative to the key insertion-removal direction Y2. Thus, the pin tumblers 46 do not move downward until being aligned with the associated holes 42. Since the pin tumblers 46 do not move into and out of non-associated holes, the distal ends of the pin tumblers 46 wear less. This prolongs the durability of the pin tumblers 46 and the tumbler springs 51.

The preferred embodiment has the advantages described below.

(1) The key code pattern 41 of the card key 38 includes the holes 42 and the non-hole portions 43 arranged along the inclined lines L1 and L2, which are inclined relative to the movable member operation direction Y1 and the key insertion-removal direction Y2. Due to such layout of the holes 42 and non-hole portions 43, the pin tumblers 46 (lock pins 50) are prevented from entering non-associated holes 42 even when inserting the card key 38 into the lock apparatus 37 or even when a key displacement occurs when trying to move the slider 45 with the card key 38. This eliminates unnecessary upward and downward movement of the pin tumblers 46 and prolongs the durability of the pin tumblers 46. Further, when key displacement occurs, less pin tumblers 46 are shifted to the locking state and the card key 38 is more easily returned to its regular state.

(2) The holes 42 and the non-hole portions 43 are arranged along the inclined lines L1 and L2, which are not parallel to the movable member operation direction Y1 and the key insertion-removal direction Y2. Thus, when the card key 38 is inserted into the lock apparatus 37 and when the card key 38 becomes displaced relative to the slider during a slider operation, the lock pins 50 do not fall into non-associated holes 42.

(3) Each unit of the holes 42 and non-hole portions 43 included in a row or a column is inclined relative to the key manipulation directions Y1 and Y2 to form the key code pattern 41. Thus, compared to when the holes 42 and non-hole portions 43 are laid out in an irregular manner, the key code pattern 41 may be formed through a more simple manufacturing operation.

(4) The card key 38 functions as an emergency key for the key operation-free system 2, and an emergency mechanical key does not need to be accommodated in the portable device 3. The emergency mechanical key can thus be omitted from the portable device 3, and the portable device 3 can be further miniaturized by the omission of the emergency mechanical key.

(5) The lock apparatus 37 of the mechanical operation type door lock system 36 is of a pin tumbler type that includes two types of pin members and is thus simple.

(6) The card key 38 is thin and card-shaped. Thus, the card key 38 may be accommodated in a small space in a wallet or the like. Thus, the card key 38 may be easily carried.

(7) The card key 38 includes in the key code pattern 41 a key code expressed by the existence and non-existence of holes 42 formed in a card material (plate material). The holes 42 may be replaced with recesses having closed bottoms when forming the key code in the card key 38. However, such a card key 38 would have to be thicker to provide sufficient depths for bottomed recess. Such a thick card key is not preferable. The card key 38 of the preferred embodiment is thin since the holes 42 extend through the card key 38.

It should be apparent to those skilled in the art that the present invention may be embodied in many other specific forms without departing from the spirit or scope of the invention. Particularly, it should be understood that the present invention may be embodied in the following forms.

The card key 38 does not have to be shaped like a credit card as described above. For example, the card key 38 may be shaped so as to include a wireless communication mechanism (RFID tag) enabling identification of an individual or electronic payment.

The shape of the holes 42 in the key code pattern 41 is not limited in any manner and does not have to be round. For example, the holes may be oblong, tetragonal, or triangular.

Further, the holes 42 are not limited to round holes having the same dimensions and may include small round holes and large round holes. Alternatively, the holes 42 may include round holes and holes having other shapes.

The quantity of the holes 42, the quantity of the non-hole portions 43, the ratio between the holes 42 and the non-hole portions 43, and the total quantity of the holes 42 and non-hole portions 43 are not limited in any manner and may be changed. Further, the hole distance La and hole diameter Lb do not have to be set as fixed values.

The mechanical key of the mechanical operation type door lock system 36 is not limited to the card key 38, which is a very thin plate shaped identically to a credit card, and may be a rather thick plate such as a memory card. Further, the mechanical key does not have to be tetragonal (rectangular) and may have any shape. For example, the mechanical key may be round.

It is preferable that the holes 42 that form the key code pattern 41 extend through the card key 38. However, recesses that do not extend through the card key 38 may be used in lieu of the holes 42.

The lock apparatus 37 is not limited to a structure for manually moving the slider 45 with the card key 38. An electrical structure for detecting the pin tumbler unlocking state of all the pin tumblers with a sensor and moving the slider 45 with power from the motor and the like may be adopted.

The lock apparatus 37 is not limited to a slide type in which the movable member (slider 45) linearly slides and may be a rotatable type in which the movable member is rotated by a key.

The lock apparatus 37 is not limited to a structure in which the slider 45 moves in two directions from a neutral position to open or close the lock apparatus 37. For example, the lock apparatus 37 may have a structure in which the lock apparatus 37 switches between open and closed states whenever the slider 45 is moved in the same direction from the neutral position.

The biasing member for biasing each pin tumbler 46 is not limited to a spring and may be a rubber material.

The lock apparatus 37 is not limited to a pin tumbler-type including the pin member, and may be a disk tumbler-type in which the tumbler member is plate-shaped.

The activation of the relays 32 to 34 is not limited to electrical management by the power supply ECU 28 and may be a mechanical type in which the relays are switched between activated and deactivated states by the physical operation of a key.

The electronic key system is not limited to a key operation-free system 2 in which the locking and unlocking of the door and the starting and stopping of the engine are automatically permitted or executed as long as the driver is carrying the proper portable device 3. A wireless key system in which various operation buttons are formed in the electronic key may be used in which an operation request command and key code are transmitted to the vehicle 1 through wireless communication when such a button is pushed.

The engine starting and stopping system of the vehicle 1 is not limited to a one-push engine start system 24 and may be a mechanical operation engine starting and stopping system in which the mechanical key 38 is inserted into the engine starting and stopping key cylinder and turned to start or stop the engine. In this case, the card key 38 may be used to switch electrical power supplies of the vehicle 1.

The mechanical operation key system using the card key 38 is not necessarily limited to emergency use with the smart entry system 4 and may be used during an emergency of the one-push engine start system 24. The mechanical operation key system using the card key 38 of the preferred embodiment merely needs to be adopted in at least one of the smart entry system 4 or the one-push engine start system 24.

The key operation-free system 2 may be an immobilizer system that performs wireless ID verification with a communication tag component incorporated in the portable device 3. In the immobilizer system, the portable device 3 is held near a transponder key coil, which is arranged in a vehicle. This causes the coil to transmit drive radio waves that activate a transponder in the portable device. Then, the activated transponder sends a transponder code signal to the vehicle 1, and the vehicle 1 performs ID verification (immobilizer verification) using a code that is included in the transponder code signal. In this case, in-vehicle verification, which must be established to start the engine, does not have to be performed after the key operation-free system 2 establishes ID verification (in-vehicle verification) and may be performed when any one of the key operation-free system 2 and the immobilizer system establishes ID verification.

The mechanical operation type door lock system 36 is not limited to vehicles, and may be used in various components for opening and closing components such as the door of a house and the like.

The present examples and embodiments are to be considered as illustrative and not restrictive, and the invention is not to be limited to the details given herein, but may be modified within the scope and equivalence of the appended claims.

What is claimed is:

1. A mechanical key code verification system comprising:
   a mechanical key; and
   a lock apparatus into which the mechanical key is insertable;
   the mechanical key including:
   a key body having at least one plane; and
   a key code pattern formed on the at least one plane of the key body and including a plurality of recessed portions and a plurality of non-recessed portions, the plurality of recessed portions and the plurality of non-recessed portions arranged in a plurality of rows and a plurality of columns;
   the lock apparatus including:
   a plurality of tumblers, each of the plurality of tumblers associated with one of the plurality of recessed portions or one of the plurality of non-recessed portions in the key code pattern when the mechanical key is inserted into the lock apparatus to a fully inserted position; and
   a plurality of biasing members respectively biasing the plurality of tumblers;
   wherein the lock apparatus mechanically verifies the key code pattern when the mechanical key is inserted into the lock apparatus to the fully inserted position based on whether or not the plurality of tumblers are aligned with the associated ones of the plurality of recessed portions and plurality of non-recessed portions,
   wherein oblique angles are formed between the plurality of rows and the plurality of columns, and
   wherein the oblique angles are such that the perimeter of each of the plurality of tumblers completely enters only the perimeter of the associated recessed portion at the fully inserted position and at least one of the plurality of tumblers overlaps with a non-associated recessed portion of the mechanical key over an overlapping area but does not completely enter the non-associated recessed portion when the mechanical key is inserted into the lock apparatus to a partially inserted position before the fully inserted position.

2. The mechanical key code verification system according to claim 1, wherein:
the mechanical key is moved in a key insertion-removal direction and a movable member operation direction; and
the plurality of recessed portions in the key code pattern is deviated from at least one of the key insertion-removal direction and the movable member operation direction.

3. A vehicle having the mechanical key code verification system according to claim 1, wherein:
the mechanical key code verification system is a mechanical operation type key system arranged in the vehicle and including an electronic key system which verifies an electronic key code transmitted through wireless communication from an electronic key.

4. The mechanical key code verification system according to claim 1, wherein the lock apparatus includes:
a support member; and
a movable member which is movable relative to the support member,
and wherein each of the tumblers is a pin tumbler including a first lock pin arranged in the movable member and a second lock pin arranged in the support member, in which the mechanical verification of the key code pattern is established thereby enabling the movable member to be movable when a shear line between the first lock pins and the second lock pins of the plurality of pin tumblers in the lock apparatus is aligned with a shear line between the movable member and the support member in the lock apparatus.

5. The mechanical key code verification system according to claim 1, wherein the plurality of recessed portions in the key code pattern are through holes.

6. The mechanical key code verification system according to claim 1, wherein the mechanical key is a card key.

7. The mechanical key code verification system according to claim 1, wherein:
the mechanical key is operable in a key insertion-removal direction and a movable member operation direction; and
the plurality of recessed portions in the key code pattern is arranged on a plurality of inclined row lines, which are inclined relative to the key insertion-removal direction, and a plurality of inclined column lines, which are inclined relative to the movable member operation direction.

8. The mechanical key code verification system according to claim 7, wherein the plurality of recessed portions in the key code pattern are arranged at intersections of the plurality of inclined row lines and the plurality of inclined column lines.

* * * * *